UNITED STATES PATENT OFFICE.

WALTER H. DICKERSON, OF NEW YORK, N. Y.

PROCESS OF RECOVERING THE SOLIDS OF WASTE PULP LIQUORS.

1,396,028.   Specification of Letters Patent.   Patented Nov. 8, 1921.

No Drawing.   Application filed December 8, 1919.   Serial No. 343,335.

*To all whom it may concern:*

Be it known that I, WALTER H. DICKERSON, a citizen of the United States, and a resident of New York, in the county of New York and State of New York, have invented certain new and useful Improvements in the Processes of Recovering the Solids of Waste Pulp-Liquors, of which the following is a specification.

The invention relates to the recovery of the solid content of solutions such, for example, as the waste pulp-liquors resulting from the sulfite or soda processes of making paper pulp.

The invention relates more particularly to a process suitable for use where the fuel cost is high; and it has for its object a method of treatment of such liquors whereby great economy is effected over the usual well known vacuum evaporation of liquors. I have found that the solid content of the waste pulp-liquors may be readily and inexpensively obtained, for example in dry powdered form, by subjecting the liquors to the following treatment.

The waste pulp or other liquor, it will be appreciated, is at a comparatively high temperature as it is discharged from the digesters, being substantially at the boiling point. In accordance with my invention, this hot liquor is sprayed into a suitable tower or chamber through which a sufficient volume of air or gas is directed, said air or gas being at atmospheric or somewhat higher temperature. The purpose of this treatment is to remove as much as possible of the water as will be given off by the liquor due to self-evaporation resulting from its own heat content and also to the heat present in the air or gases employed. The self-evaporation is carried on, also, for the purpose of reducing the temperature of the liquor to as low a point as possible; and I have found that approximately ten (10%) per cent. of the water content originally present may be removed in this manner and that a temperature reduction of several degrees below the atmospheric temperature may be effected within a reasonable time. This preliminary spraying and evaporation serves also to remove free sulfur dioxid and puts the liquor in particularly favorable condition for fermentation, when waste sulfite liquors are treated.

The liquor at this stage may be fermented for the recovery of alcohol, thereby removing from said liquor the fermentable sugars present which may amount to as high as ten (10%) per cent. of the total organic solid material. The alcohol is distilled from the fermented liquor and the remaining portion, after first being clarified, may be then treated in the manner hereinafter set forth.

Or, this liquor or the liquor not treated for the recovery of alcohol, may be then or at some other stage of the process chemically processed to remove any undesirable constituents, for example calcium, as well as to split up the organic complex for example for the purpose of rendering the tanning elements available.

The liquor which has thus been reduced both in water content and in temperature by initial treatment of spraying is in suitable condition for further concentration by freezing out additional water, which may be effected by passing the same through suitable tanks in which are immersed freezing plates; or, where the atmospheric conditions warrant, by exposing same directly to the atmosphere.

The liquor having been concentrated in this manner for the removal of approximately eighty (80%) per cent. of its original water content, is then ready for treatment to effect a complete drying of the same; and I prefer for this purpose to reheat the liquor somewhat, for example by exposing it to a fresh batch of warmer, partly concentrated liquor which is being advanced for the freezing concentration. The concentrated liquor is best dried by atomizing same into hot air or gases, a dry substantially non-hydroscopic powder resulting. As an economical source of hot gas, I may use the waste flue gases from a boiler plant, and if same are badly contaminated by smoke or cinders, the gases may first be cleaned by suitable electrical apparatus or by means of a centrifugal separator.

I claim:

1. The process of recovering the solids of hot waste pulp-liquors, which consists in effecting a self-evaporation of the digester liquor to thereby concentrate and cool same; freezing out a portion of the remaining water to further concentrate the liquor; and drying the liquor thus concentrated.

2. The process of recovering the solids of hot waste pulp-liquors, which consists in effecting a self-evaporation of the digester liquor to thereby concentrate and cool same;

freezing out a portion of the remaining water to further concentrate the liquor; and drying the liquor thus concentrated by spraying same into hot gas to afford the solids thereof in dry powdered form.

3. The process of recovering the solids of hot waste pulp-liquors, which consists in effecting a self-evaporation of approximately 10% of the digester liquor and simultaneously cooling same thereby; freezing out additional water to effect a total removal of approximately 80% of the original water content; and drying the concentrated liquor by spraying into hot gas to afford the solids thereof in dry powdered form.

4. The process of recovering in dry powdered form the solids of hot waste pulp-liquors, which consists in effecting a self-evaporation of approximately 10% of the digester liquor and cooling same by spraying into a stream of air or gas; freezing out additional water to effect a total removal of approximately 80% of the original water content to further concentrate the liquor; exposing the concentrated liquor to fresh batches of warmer, partly concentrated liquor; and drying the concentrated warmed liquor by spraying into hot gas to afford the solids thereof in dry powdered form.

5. The process of recovering the solids of hot waste pulp-liquors, which consists in effecting a self-evaporation of the digester liquor to thereby concentrate and cool same; fermenting the sugar content and removing the alcohol formed; freezing out a portion of the remaining water to further concentrate the liquor; and drying the liquor thus concentrated.

6. The process of recovering the solids of hot waste sulfite liquors, which consists in effecting a self-evaporation of the digester liquors, to thereby concentrate and cool same and to remove sulfur dioxid therefrom by spraying into a stream of air or gas; and fermenting the sugar content and removing the alcohol formed.

7. The process of receiving the solids of hot waste sulfite liquors which consists in effecting a self-evaporation of the digester liquors, to thereby concentrate and cool same and to remove sulfur dioxid therefrom by spraying into a stream of air or gas; fermenting the sugar content and removing the alcohol formed; freezing out a portion of the remaining water to further concentrate the liquor; and drying the liquor thus concentrated.

Signed at New York, in the county of New York and State of New York this 5th day of December A. D. 1919.

WALTER H. DICKERSON.